April 15, 1924.                                                    1,490,489
                         E. S. SEAVEY
                    FLEXIBLE CLAMPING JOINT
                     Filed Feb. 23, 1921
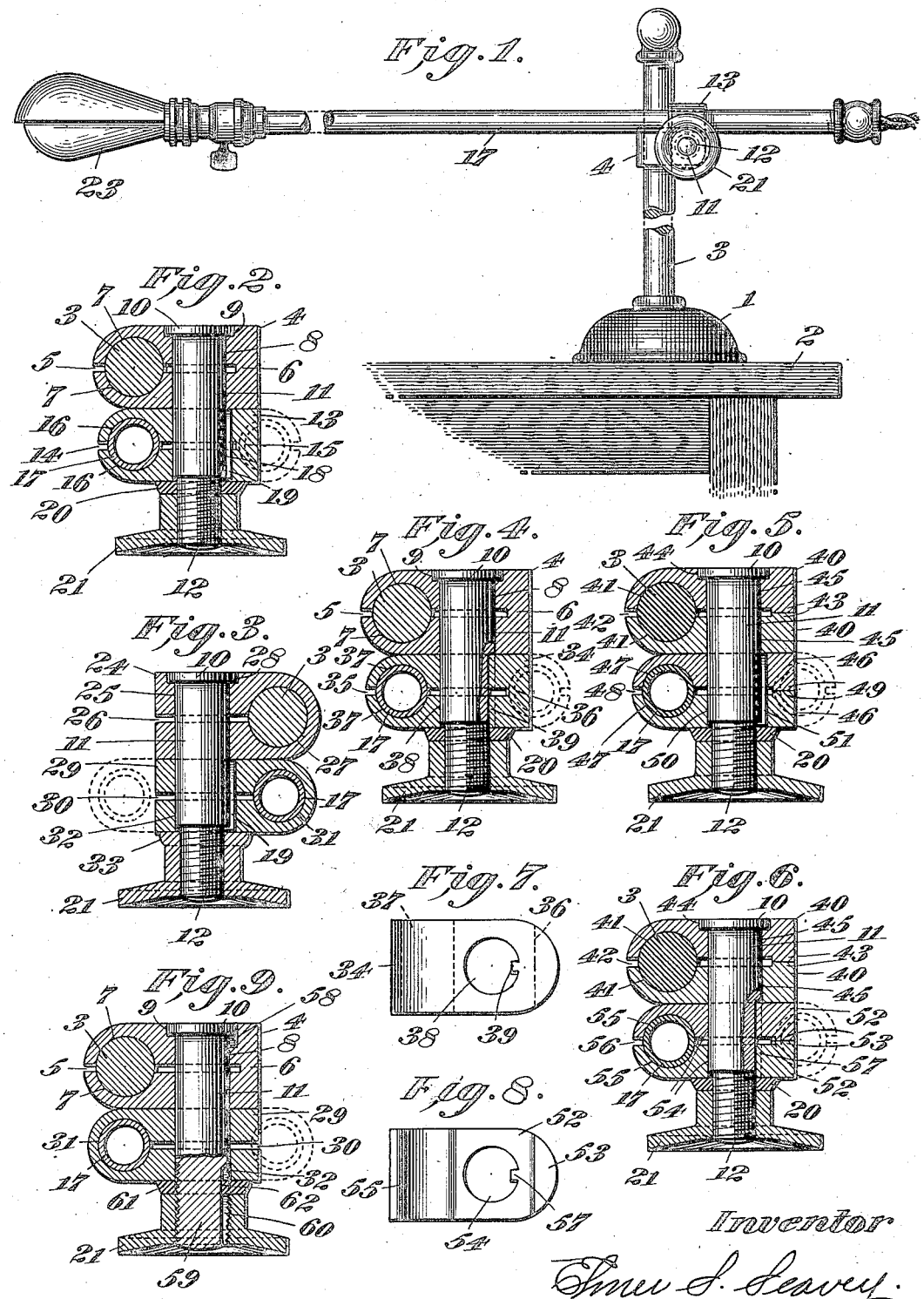

Patented Apr. 15, 1924.

1,490,489

UNITED STATES PATENT OFFICE.

ELMER S. SEAVEY, OF JOHNSTOWN, PENNSYLVANIA, ASSIGNOR OF ONE-HALF TO JOSEPH E. ZANG, OF JOHNSTOWN, PENNSYLVANIA.

FLEXIBLE CLAMPING JOINT.

Application filed February 23, 1921. Serial No. 447,275.

*To all whom it may concern:*

Be it known that I, ELMER S. SEAVEY, a citizen of the United States, and residing in the city of Johnstown, in the county of Cambria and State of Pennsylvania, have invented certain new and useful Improvements in Flexible Clamping Joints; and I hereby declare the following to be a full, clear, and exact description of the invention, such as will enable others skilled in the art to which it appertains to make and use the same.

My invention relates to adjustable flexible clamping joint connections, and more particularly to flexible clamping joints whereby two elements such as two tubes or rods may be sustained in any desired longitudinally adjusted, vertically adjusted, or angularly adjusted position relative to each other.

One of the objects of my invention is to provide a very simple and effective form of a flexible clamp connection between two supporting elements by means of clamping members, each clamping member being formed with a jaw, or a pair of jaws, for engaging the two supporting elements. The said clamping members being secured together at one side of the supporting elements in such a manner so that the elements may be readily shifted longitudinally relatively to each other and as readily clamped so firmly in their adjusted position that they can not be accidentally shifted therefrom.

Another object of the invention is to provide a flexible clamping joint having means for clamping two elements in their longitudinally adjusted position, so constructed as to permit the elements to be rotated relative to each other so as to secure any desired angular adjustment of the elements without, however, releasing any of the pressure of the clamp and without in any way affecting the clamping action.

A further object of the invention is to provide a flexible clamping joint in which one of the supporting elements, held by the clamping member can be rotated, while the other supporting element remains stationary, or both may be rotated at the same time without releasing the clamping action.

Another object of the invention is to provide a construction in which two elements may be moved to any desired position vertically, or horizontally by a slight push or pull, and so formed that the elements will remain in their position until moved again.

A further object of the invention is to provide a construction of this character in which the elements may be moved forward or backward to shorten or lengthen them relative to the pivotal center of the elements by slightly releasing the clamping pressure.

Another object of the invention is to provide a flexible clamping joint in which the gripping or clamping power of a screw is used to simultaneously clamp the supporting elements supported by the flexible clamping joint, the device being so formed that the slackening or tightening up of this one screw will act to release the supporting elements to permit of their longitudinal adjustment or will tighten up the supporting elements.

A further object of the invention is to construct a flexible clamping joint, in such a manner that either of the clamping members may be rotated without unscrewing or affecting the clamping action of the nut.

Still another object of my invention is to provide a joint of this character in which two smooth confronting bearing members are provided to which the two supporting elements are clamped, these bearing members being rotated into frictional engagement with each other by the action of the clamping bolt, but being always in rotative engagement with each other so that the two supporting elements may be independently shifted with a minimum effort.

In a copending application, filed by me dated Jan. 26, 1921, Serial No. 440,147, I have shown and described a flexible clamping joint in which the bolt is keyed to the clamping member which is mounted upon the standard or main support, the nut and washer being on one side of the standard, while the clamping member attached to the rotating bracket arm is on the other side or back of the standard, in such a manner that when the bracket arm and clamping member are rotated the bolt remains stationary relatively thereto. In my present application however I have illustrated a flexible clamping joint in which I have keyed the rotating clamping member for holding the bracket arm, to the bolt and mounted on the same side of the standard as the nut and washer and in front of the standard where it can be more easily operated, in such a manner that when the bracket arm and its supporting clamping member are rotated the bolt, nut and washer are rotated therewith, and this forms another feature of my invention.

Other objects of my invention will appear hereinafter.

Having thus given a general description of my invention, I will now in order to make the same more clear, refer to the accompanying one sheet of drawings in which like characters of reference indicate like parts.

Figure 1 is a front elevation of a portable electric light supporting bracket illustrating the application of my flexible clamping joint for this purpose.

Figure 2 is a central vertical longitudinal sectional elevation of one form of flexible clamping joint I may use drawn on a larger scale to that shown in Figure 1.

Figures 3, 4, 5, 6 and 9 are central vertical longitudinal sectional elevations of slightly modified forms of flexible clamping joints drawn on a scale similar to that shown in Figure 2.

Figure 7 is a plan view of the bracket arm clamping member used with the flexible clamping joint illustrated in Figure 4, and Figure 8 is a plan view of the inner face of one of the bracket arm clamping members used with the flexible clamping joint shown in Figure 6.

Referring now to the characters of reference on the drawings, and first to Figures 1 and 2, the numeral 1, indicates the weighted base of a portable electric lamp bracket adapted to be placed upon a table 2, or any other desired position where it may be easily seated. To the base 1, is secured a standard 3, extending vertically therefrom upon which is mounted one of my improved flexible clamping joints. This flexible clamping joint comprises a clamping block 4, split centrally as at 5, from one end nearly to the opposite end thereof, where the two parts are integrally joined together as at 6. A cylindrical perforation is formed near one end of the clamping block 4, in the plane of the split 5. Half of the cylindrical perforation being preferably on one side of the split and half on the other side thereof, forming arc-shaped jaws 7, 7, for engaging the cylindrical sides of the standard 3. Another cylindrical perforation extends at an intermediate point through the clamping block 4, at right angles to the split 5, having an annular counterbore at one end of the cylindrical perforation as at 9, for the reception of the head 10 of a bolt 11, which is screw-threaded at the opposite end as at 12.

Another clamping block 13, preferably of slightly smaller size than the clamping block 4, but of similar formation, being split centrally as at 14, from one end of the clamping block nearly to the opposite end thereof, where the two parts are integrally joined together as at 15, a cylindrical perforation near one end of the clamping block in the same plane as the split forming arc-shaped jaws 16, 16, for receiving and holding the bracket arm 17, to the outer end of which is secured the lamp socket and shade for the lamp 23 and a cylindrical perforation 18, at an intermediate point through the clamping block, transversely of the line of the split 14.

The bolt 11 passes through the perforation 8, in the clamping block 4, and the perforation 18, in the clamping block 13, where the bolt 11 is keyed to the clamping block 13, as at 19. The threaded end 12, of the bolt 11 is shown of slightly reduced cross-sectional area so that the groove for the key will not extend through the thread of the screw, but if desired it may be made as shown in Figure 9, the same size as the body of the bolt.

Upon the threaded end 12 of the bolt 11 is mounted a washer 20, and a nut for securing the clamping blocks 4 and 13 together, which may be a wheel nut 21, as shown in full lines, or a wing nut 22 indicated in dotted lines if preferred.

In Figures 3, 4, 5, 6 and 9 I have shown slightly modified forms of the joint illustrated in Figures 1 and 2, and for convenience of description in the several figures where the parts are similar, the same reference numerals will be used.

In Figure 3 I have shown the clamping block 24, which is mounted on the standard 3 with a perforation 25, extending through the block transversely to the split 26, and a perforation 27, in the same plane as the split, for receiving and clamping the standard 3. A bolt 11, passes through the cylindrical perforation 25, the head of which being received in the counterbore 28. Another clamping block 29, similar to that indicated at 24, split as at 30, with a cylindrical perforation extending therethrough in the same plane as the split for receiving and clamping the bracket arm 17, and a cylindrical perforation 32 extending transversely therethrough in line with the cylindrical perforation 25, for the passage of the bolt 11, which is keyed as at 19 thereto, and a wheel nut 21 having a beaded inner face 33, formed integrally therewith instead of a washer for engaging the side face of the clamping block 29 and is screwed on the screw-threaded end 12 of the bolt for securing the clamping blocks together.

It will be noticed by comparison that the split and perforations in the clamping blocks shown in Figure 3, are the reverse of those illustrated in Figure 2. The cylindrical perforations for receiving the standard 3 and the bracket arm 17 being at the inner end of the split instead of at the outer end, as in Figure 2, and the bolt 11 passing through the cylindrical perforations at right angles to the split near the outer end of the split instead of near the inner end.

In Figure 4 I have shown a clamping joint similar to that illustrated in Figure 2, with the exception that the clamping block for supporting the bracket arm 17, has a key projection formed integrally therewith. In this figure 34 indicates the clamping block split transversely as at 35 from one end of the clamping block nearly to the opposite end thereof, where it is connected together as at 36. A cylindrical perforation forming arc-shaped jaws 37 are formed therein and a transverse perforation 38 into which extends the key projection 39, formed integrally with the clamping block 34, as clearly shown in Figures 4 and 7 of the drawings.

In Figure 5 I have shown each clamping block made in halves, otherwise the construction is the same as in Figure 2. In this figure, 40 indicates the two halves of the clamping block for engaging the standard 3, each half being formed with arc-shaped jaws 41, 41, which when assembled are spaced apart as at 42, when clamped in position, from one end of each half of the clamping block 40 nearly to the opposite end thereof, where it has a contact projection 43. Each half of the clamping blocks 40, is perforated as at 45, for the passage of the bolt 11, and one of the halves has a counterbore 44, for receiving the head 10 of the bolt. 46, 46, indicates the two halves of the clamping block for engaging and supporting the bracket arm 17, being similar to the two halves of the clamping blocks attached to the standard, having arc-shaped jaws 47, 47. The two halves being spaced apart as at 48 with contact projections 49, perforations for the bolt 50 and a key 51, for keying the two halves to the bolt. In this construction when the wheel nut 21 is screwed upon the threaded end of the bolt 11, the clamping action of the clamping joint is the same as that in Figure 2.

In Figure 6 I have shown a clamping joint similar to that illustrated in Figure 5, with the exception that the two halves of the clamping block for gripping and supporting the bracket arm 17 are formed with integral key projections. In this figure the two halves of the clamping block for holding the bracket arm 17 are indicated by the numeral 52, 52, having contact projections 53 at one end on their inner faces, and cylindrical perforations 54, for the passage of the clamping bolt 11 therethrough. The two halves are formed with arc-shaped jaws 55, for receiving and gripping the bracket arm 17. The two halves of the blocks being spaced apart centrally as at 56 and having integrally formed key projections as at 57 for extending into the keyway or groove in the bolt 11, as will be clearly understood by referring to Figures 6 and 8, otherwise this joint is constructed the same as the joint shown in Figure 5.

In Figure 9, I have illustrated a joint constructed with two different styles of split clamping blocks. The clamping block 4, engaging the standard 3, is formed with a split similar to that shown in Figure 2, but in this case the bolt is keyed to the clamping block as indicated at 58. The clamping block 29, for engaging the bracket arm 17, is split as at 30, similar to the clamping blocks used in the construction shown in Figure 3, but is not keyed to the bolt. In this construction the threaded end 59 of the bolt is not reduced in cross-sectional area as illustrated in the other figures, but a keyway is formed therein for receiving the integrally formed key projection 62 on the washer 61. In this construction when the bracket arm 17 and the clamping block 29, are rotated the bolt 11 and the other parts of the clamping joint remain stationary, but it will be readily understood that I may mount the clamping block 29 on the opposite side of the clamping block 4, and have it keyed to the head end of the bolt, in which case when the clamping block 29 and bracket arm 17 are rotated the bolt 11, washer 61 and nut 21 will all rotate together and as the washer 61 is keyed to the bolt, the turning of the bolt will not unscrew or turn the nut or effect the gripping action of the bolt.

In Figures 2, 3, 4, 5, 6 and 9 I have shown in dotted lines the extreme position which the end of the clamping blocks and bracket arms will assume, the clamping blocks attached to the standard as having a rotary movement, but I wish it understood that either may be rotated if desired when the joint is used for a different kind of a device.

With my improved joint when the nut is screwed on tight either of the clamping blocks may be rotated at will by a slight push or pull with the bolt as its axis, while the clamping block attached to the standard can be rotated around the standard as its axis.

While I have shown in Figure 7, my flexible clamping joint as being applied to a portable bracket supporting an electric light, I wish it understood that it can be used for other purposes equally as well, where it is desired to secure similar results.

Although I have shown and described my invention in considerable detail, I do not wish to be limited to the exact and specific details shown and described, but may use such substitutions, modifications or equivalents thereof as are embraced within the scope of my invention, or as pointed out in the claims.

Having thus described my invention what I claim and desire to secure by Letters Patent is:—

1. In a flexible joint, comprising a pair of rods or tubes, one of said rods or tubes adapted to form a relatively fixed standard and the other a rotating bracket arm mounted in front of the standard, a split clamping block engaging each rod or tube having flat friction side faces with jaws formed therein near the outer end of the split, means for securing the flat friction side faces of the split clamping blocks together in frictional contact with each other, and means for rotating the split clamping block engaging the bracket arm and the securing means together.

2. In a flexible joint, comprising a pair of rods or tubes, one of said rods or tubes adapted to form a relatively fixed standard and the other a rotating bracket arm mounted in front of the standard, a split clamping block engaging each rod or tube having flat friction side faces with jaws formed therein near the outer end of the split, a swivel connection for securing the flat friction side faces of the split clamping blocks together in frictional contact with each other, means for rotating the split clamping block engaging the bracket arm and the swivel connection together, and means for increasing or decreasing the frictional engagement between the flat friction side faces of the split clamping blocks.

3. In a flexible joint, comprising a pair of rods or tubes, one of said rods or tubes adapted to form a relatively fixed standard and the other a rotating bracket arm, a split clamping block having flat friction side faces, arc-shaped jaws formed therein near the outer end of the split formed in the clamping block for engaging each rod or tube, a swivel connection for securing the flat friction side faces of the split clamping blocks together in frictional contact with each other, means for rotating the split clamping block engaging the bracket arm and the swivel connection together, and means for increasing or decreasing the frictional engagement between the flat friction side faces of the split clamping blocks.

4. In a flexible joint, comprising a pair of rods or tubes, one of said rods or tubes adapted to form a relatively fixed standard and the other a rotating bracket arm, a split clamping block having arc-shaped jaws formed therein near the outer end of the split for engaging each rod or tube, a bolt forming a swivel connection between the split clamping blocks and keyed to rotate with the split clamping block engaging the rotating bracket arm, and means for increasing or decreasing frictional engagement between the split clamping blocks and the rods or tubes.

5. In a flexible joint, comprising a pair of rods or tubes, one of said rods or tubes adapted to form a relatively fixed standard and the other a rotating bracket arm, a split clamping block having arc-shaped jaws formed therein near the outer end of the split for engaging each rod or tube, flat friction side faces on the split clamping blocks for engaging each other, a bolt forming a swivel connection between the split clamping blocks, a nut on the bolt for increasing or decreasing frictional engagement between the flat friction side faces of the split clamping blocks, and a key connection for securing the split clamping block engaging the bracket arm to the bolt whereby the split clamping block and the bolt are adapted to rotate together.

6. In a flexible joint, comprising a pair of rods or tubes, a split clamping block having flat friction side faces for engaging each other, one for each rod or tube having arc-shaped jaws near the outer end of the split for engaging the rods or tubes, a bolt having a screw-threaded projecting end extending through the split clamping blocks, the split clamping block nearest the screw-threaded end of the bolt being keyed to the bolt and adapted to rotate therewith, and a nut on the screw-threaded end of the bolt for increasing or decreasing frictional engagement between the split clamping blocks and rods or tubes.

7. In a flexible clamping joint, comprising a standard, a split clamping block having arc-shaped jaws engaging the standard near the outer end of the split, an arm supported by a split clamping block having arc-shaped jaws formed therein near the outer end of the split, a bolt passing through perforations in the split clamping blocks at one side of the standard and arm, forming a swivel connection between the split clamping blocks, the head of said bolt rotatably mounted in the split clamping block attached to the standard, and having a screw-threaded projecting end with a nut mounted thereon, the split clamping block engaging the bracket arm being mounted upon and keyed to the bolt between the split clamping block engaging the standard and the nut, whereby when the arm and split clamping block are rotated the bolt and nut are adapted to rotate with them, and means for increasing or decreasing frictional engagement between the members to be clamped.

8. In a flexible joint, comprising a pair of rods or pipes, of a pair of clamping members of similar formation, one for each rod or pipe, a split extending nearly through each clamping member, jaws formed therein near the outer end of each split for engaging the rods or pipes, said clamping members having flat friction side faces for engaging each other for rotation on an axis at one side of the rods or pipes, and means for increasing or decreasing frictional engagement between said clamping members.

9. In a flexible joint, comprising a pair of rods or pipes, a pair of clamping blocks each having a flat friction side face for engaging each other and a split extending nearly through each block and two perforations, one in the plane of the split near the outer end thereof forming jaws for the rods or pipes, and one intersecting said split at right angles thereto, and means for clamping the clamping blocks together thereby contracting the size of the perforations forming jaws.

10. In a flexible joint, comprising a pair of rods or pipes, a pair of clamping blocks of similar formation, each clamping block having a flat friction side face for engaging each other, one for each rod or pipe, a split extending nearly through each block and two perforations in each clamping block, one perforation in the plane of the split near the outer end thereof forming jaws for engaging the rods or pipes, and a perforation intersecting said split at right angles thereto, a bolt passing through the perforations in the clamping blocks at right angles to the split for connecting the clamping blocks together thereby contracting the size of the perforations forming jaws and increasing or decreasing frictional engagement between said clamping blocks.

11. In a flexible joint, comprising a pair of rods or pipes, a pair of coacting clamping blocks, one for each rod or pipe, each clamping block having a flat side face in frictional engagement with each other, a split extending nearly through each block and two perforations formed in each clamping block, one perforation in the plane of the split near the outer end thereof forming jaws for engaging the rods or pipes, and a perforation intersecting said split at right angles thereto, a bolt passing through the perforations in the clamping blocks at right angles to the split forming a swivel connection for connecting the two clamping blocks together, and means on the bolt for increasing or decreasing the size of the perforations forming jaws, and increasing or decreasing frictional engagement between said clamping blocks.

12. In a flexible joint, comprising two split coacting clamping blocks of similar formation with flat friction side faces for engaging each other and having jaws formed therein near the outer end of the split, adapted to engage a rod or tube, perforations extending through each clamping block, a bolt extending through the perforations in each clamping block for connecting the two coacting clamping blocks together, said bolt being keyed to one of the clamping blocks, and means for increasing or decreasing frictional engagement between the clamping blocks.

13. In a flexible clamping joint, comprising two split coacting clamping blocks of similar formation having flat friction side faces for engaging each other, each clamping block being split from one end nearly to the other end and having jaws formed therein near the outer end of the split adapted to engage a rod or tube, perforations extending through each clamping block transversely of the split formed therein between the jaws and the closed end of each clamping block, a bolt extending through the perforations in each clamping block for connecting the two coacting clamping blocks together, means for increasing or decreasing frictional engagement between the clamping blocks, and means for increasing or decreasing frictional engagement between the jaws and the rods or tubes mounted therein.

14. In a flexible clamping joint, comprising two split coacting clamping blocks having flat friction side faces for engaging each other, the split in each clamping block extending from one end nearly to the other end thereof, a perforation in each clamping block in the plane of the split near the open end adapted to engage a rod or pipe, a perforation in each clamping block intersecting the split at right angles thereto between the jaws and the closed end of the clamping block, and means passing through the perforations for clamping the opposite sides of the clamping block toward each other to contract the sides of the perforations adapted to engage the rods or pipes.

15. In a flexible clamping joint, comprising two split coacting clamping blocks having flat friction side faces for engaging each other, the split in each clamping block extending from one end nearly to the other end thereof, a perforation in each clamping block in the plane of the split near the open end adapted to engage a rod or pipe, a perforation in each clamping block intersecting the split at right angles thereto, between the jaws and the closed end of each clamping block, a bolt passing through the perforations for connecting the clamping blocks together, said bolt having an extending screw-threaded end, a nut on the screw-threaded end of the bolt for increasing or decreasing frictional engagement between the contacting sides of the clamping blocks and for contracting or retracting the sides of the perforations adapted to engage the rods or pipes.

16. In a flexible clamping joint, comprising two split coacting clamping blocks having flat friction side faces for engaging each other, the split in each clamping block extending from one end nearly to the other end thereof, a perforation near the end in each clamping block in the plane of the split near the open end adapted to engage and clamp a rod or pipe, a perforation near the opposite end in each clamping block intersecting the split at right angles thereto, a bolt passing through the perforations for connecting the clamping blocks together, said bolt having a head for engaging one side of one of the clamping blocks, the opposite end of the bolt having an extending screw-threaded end, a washer on the screw-threaded end of the bolt for engaging the side of the clamping block, and a nut on the screw-threaded end of the bolt engaging the washer for increasing or decreasing frictional engagement between the contacting sides of the clamping blocks and adapted for contracting or retracting the sides of the perforations engaging the rods or pipes.

17. In a flexible clamping joint, comprising two split coacting clamping blocks, the split in each clamping block extending from one end nearly to the other end thereof, a perforation in each clamping block in the plane of the split near the open end adapted to engage a rod or pipe, a perforation in each clamping block intersecting the split at right angles thereto, a bolt passing through the perforations, one of the clamping blocks being secured to the bolt to prevent the bolt from turning in the said clamping block, and means on the bolt for increasing or decreasing frictional engagement between the several parts of the clamping joint.

18. In a flexible clamping joint, comprising two split coacting clamping blocks, a transverse perforation near one end of each of the clamping blocks in the plane of the split near the outer end thereof forming a pair of arc-shaped jaws adapted to engage a rod or tube, a transverse cylindrical perforation near the opposite end of each clamping block intersecting the split at right angles thereto, a bolt passing through the perforations for connecting the clamping blocks together, having a head with a flat under side face seated in an annular recess at one side of the clamping blocks and an extending screw-threaded end, one of the clamping blocks being keyed to the bolt to prevent the bolt from turning in said clamping block, but allowing a swivel connection between the other clamping block and the bolt, a washer on the screw-threaded end of the bolt for engaging the clamping block and one end of the key, and a nut engaging the washer on the screw-threaded end of the bolt for increasing or decreasing frictional engagement between the contacting sides of the clamping block, and for contracting or retracting the perforations forming the arc-shaped jaws adapted to engage the rods or tubes.

19. In a flexible joint, comprising two split coacting clamping blocks each having a pair of jaws formed therein near the outer end of the split, adapted to engage a rod or tube, cylindrical perforations extending through each clamping block, a bolt extending through the perforations in each clamping block for forming a swivel connection between the two split coacting clamping blocks, said bolt being keyed to one of the clamping blocks, and means for increasing or decreasing frictional engagement between the clamping blocks.

20. In a flexible clamping joint, comprising two split coacting clamping blocks having a pair of arc-shaped jaws formed therein near the outer end of the split, each clamping block adapted to engage a rod or tube, cylindrical perforations extending through each clamping block transversely to the line of the split formed in each clamping block at one side of the arc-shaped jaws, a bolt extending through the perforations in each clamping block for forming a swivel connection between the two split coacting clamping blocks, said bolt being keyed to one of the clamping blocks, and means for simultaneously increasing or decreasing frictional engagement between the arc-shaped formed jaws in the clamping blocks and the rods or tubes and the contacting side faces of the split clamping blocks.

In witness whereof I hereunto affix my signature.

ELMER S. SEAVEY.